US010949818B2

(12) United States Patent
Deluca et al.

(10) Patent No.: US 10,949,818 B2
(45) Date of Patent: Mar. 16, 2021

(54) INTELLIGENT PAYMENT LINK

(71) Applicant: International Business Machines Corporation, Armonk, NY (US)

(72) Inventors: Lisa Seacat Deluca, Baltimore, MD (US); Michael J. Hudson, Delray Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/050,700

(22) Filed: Jul. 31, 2018

(65) Prior Publication Data
US 2020/0042966 A1 Feb. 6, 2020

(51) Int. Cl.
*G06Q 20/10* (2012.01)
*G06Q 20/02* (2012.01)
*G06Q 10/08* (2012.01)
*G06F 16/955* (2019.01)

(52) U.S. Cl.
CPC ....... *G06Q 20/102* (2013.01); *G06F 16/9566* (2019.01); *G06Q 10/08345* (2013.01); *G06Q 20/02* (2013.01)

(58) Field of Classification Search
USPC .......................................................... 705/39
See application file for complete search history.

(56) References Cited

U.S. PATENT DOCUMENTS

| 7,356,507 B2 * | 4/2008 | Bezos .................... G06Q 20/00 705/40 |
| 8,175,930 B2 * | 5/2012 | Ourega .............. G06Q 30/0619 705/26.1 |
| 8,818,878 B2 * | 8/2014 | Derby .................... G06Q 40/02 705/26.1 |
| 9,047,607 B1 * | 6/2015 | Curial .................... G06Q 30/00 |
| 2008/0010223 A1 * | 1/2008 | Hoffman .......... G07B 17/00362 705/402 |

(Continued)

FOREIGN PATENT DOCUMENTS

WO   WO-0133458 A1 *   5/2001   ......... G06Q 30/0601

OTHER PUBLICATIONS

P. Mell, et al. "*The NIST Definition of Cloud Computing*", NIST Special Publication 800-145, Sep. 2011, Gaithersburg, MD.

*Primary Examiner* — Narayanswamy Subramanian
*Assistant Examiner* — Paul S Schwarzenberg
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The method computer program products, and systems can include, for instance: registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user; and examining location data of the second user in response to activation of the payment URL by the second user and determining one or more variable data values in dependence on the location data of the second user.

19 Claims, 10 Drawing Sheets

(56) References Cited

U.S. PATENT DOCUMENTS

| | | |
|---|---|---|
| 2012/0185382 A1 | 7/2012 | Fischer |
| 2013/0096989 A1 | 4/2013 | Dale et al. |
| 2015/0073936 A1* | 3/2015 | Peterson ............ G06Q 10/0835 |
| | | 705/26.9 |
| 2015/0363843 A1* | 12/2015 | Loppatto .............. G06Q 10/083 |
| | | 705/330 |
| 2016/0132846 A1 | 5/2016 | Liu et al. |

* cited by examiner

INTELLIGENT PAYMENT LINK

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user; examining location data of the second user in response to activation of the payment URL by the second user and determining one or more variable data values in dependence on the location data of the second user; filling in one or more variable data fields of a transaction proposal template using the one or more variable data values determined by the examining to return transaction proposal data; sending the transaction proposal data to the second user for approval; and in response receiving the approval from the second user completing a payment transaction defined by transaction proposal data.

In another aspect, a computer program product can be provided. The computer program product can include a computer readable storage medium readable by one or more processing circuit and storing instructions for execution by one or more processor for performing a method. The method can include, for example: registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user; examining location data of the second user in response to activation of the payment URL by the second user and determining one or more variable data values in dependence on the location data of the second user; filling in one or more variable data fields of a transaction proposal template using the one or more variable data values determined by the examining to return transaction proposal data; sending the transaction proposal data to the second user for approval; and in response receiving the approval from the second user completing a payment transaction defined by transaction proposal data.

In a further aspect, a system can be provided. The system can include, for example a memory. In addition, the system can include one or more processor in communication with the memory. Further, the system can include program instructions executable by the one or more processor via the memory to perform a method. The method can include, for example: registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user; examining location data of the second user in response to activation of the payment URL by the second user and determining one or more variable data values in dependence on the location data of the second user; filling in one or more variable data fields of a transaction proposal template using the one or more variable data values determined by the examining to return transaction proposal data; sending the transaction proposal data to the second user for approval; and in response receiving the approval from the second user completing a payment transaction defined by transaction proposal data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
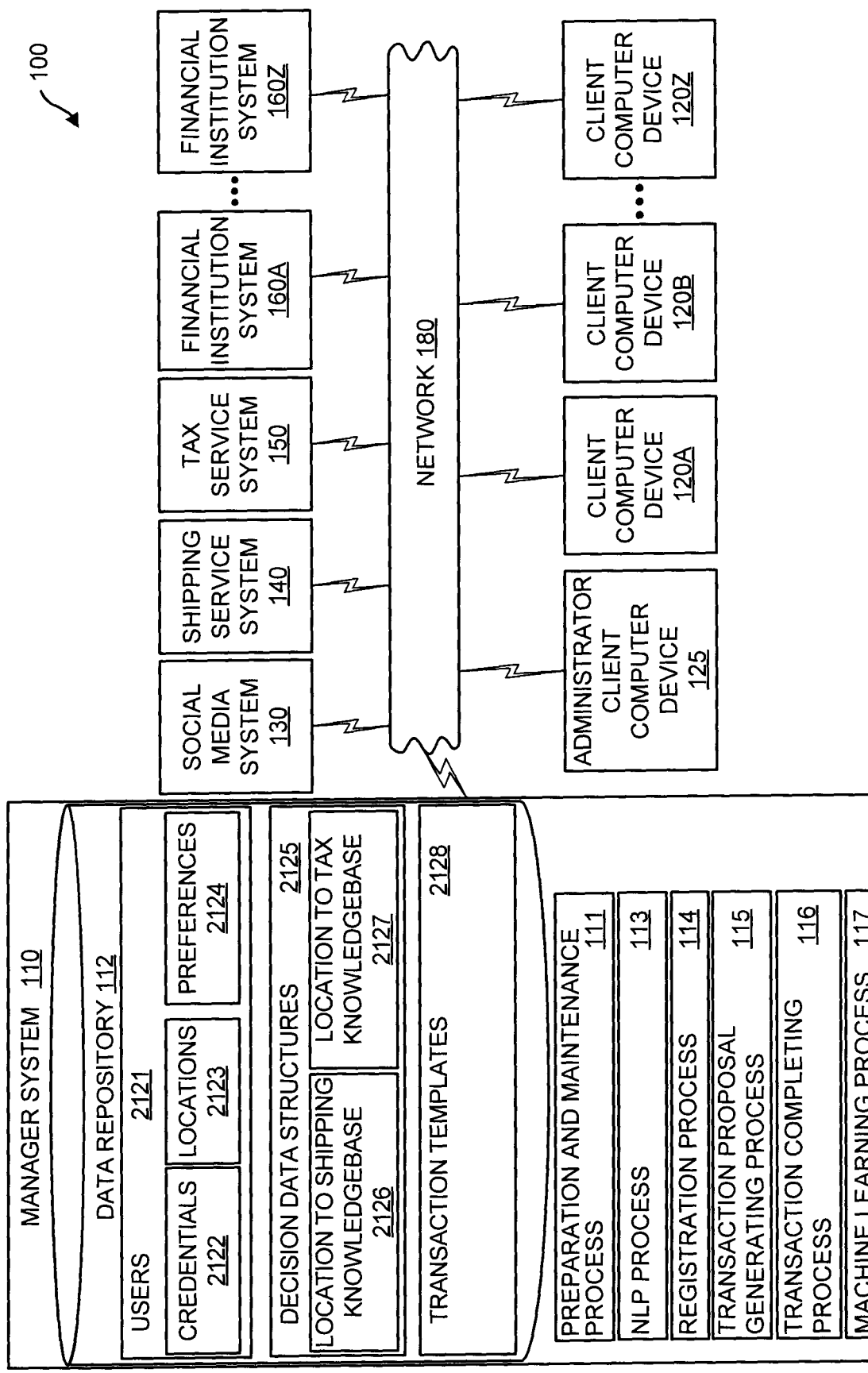
FIG. 1 is a block diagram of a system for providing location based services having a manager system, a plurality of client computer devices, a social media system, a shipping service system, one or more tax service system, and financial institution systems according to one embodiment.

System 100 for use in supporting location based services is shown in FIG. 1. System 100 can include manager system 110 having an associated data repository 112, client computer devices 120A-120Z, administrator client computer device 125, social media system 130, shipping service system 140, tax service system 150, and financial institution systems 160A-160Z. Manager system 110, client computer devices 120A-120Z, administrator client computer device 125, social media system 130, shipping service system 140, tax service system 150, and financial institution systems 160A-160Z can be in communication with one another via network 180. System 100 can include numerous devices which can be provided by computing node based devices connected by network 180. Network 180 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110 can be external to each of client computer devices 120A-120Z, administrator client computer device 125, social media system 130, shipping service system 140, tax service system 150, and financial institution systems 160A-160Z. According to one embodiment, one or more of manager system 110, client computer devices 120A-120Z administrator client computer device 125, social media system 130, shipping service system 140, tax service system 150, and financial institution systems 160A-160Z can be collocated with one another. According to one embodiment, manager system 110 can be collocated with one or more of client computer devices 120A-120Z, administrator client computer device 125, social media system 130, shipping service system 140, tax service system 150, and financial institution systems 160A-160Z. According to one embodiment each client computer devices 120A-120Z can be associated to a certain user, such as users of services provided by manager system 110. Each of the different client computer devices 120A-120Z can be associated to a different user. Client computer devices of client computer devices 120A-120Z according to one embodiment can be computing node based devices provided by client computers, e.g. mobile devices, e.g. a smart phone, tablet, laptop, smartwatch, or PC that runs one or more program, e.g. including web browser for opening and viewing web pages.

Social media system 130 can include a collection of files, including for example, HTML files, CSS files, image files, and JavaScript files. Social media system 130 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

One or more shipping services system 140 can include a database of shipping service rates provided by one or more shipping carrier service, e.g. the United States Postal Service (USPS®), UNITED PARCEL SERVICE® and FEDEX® (USPS® is a registered trademark of the United States Postal Service, UNITED PARCEL SERVICE® is a registered trademark of United Parcel Service of America, Inc. and FEDEX® is a registered trademark of FEDEX Corporation). One or more shipping services system 140 can provide rates for shipping depending on, e.g. sending location, receiving location, size information of an item being shipped. One or more shipping service system 140 can iteratively adjust its rates over time and can iteratively adjust a shipping schedule.

One or more tax service system 150 can include, e.g. a database providing tax rates based on shipping of items from location to location. Tax service system 150 can include data respecting online service shipping related tax rates. One or more tax service system 150 can iteratively update a tax rate schedule in which specified tax rates can be dependent, e.g. on shipping origination locations and/or shipping destination locations. Data of one or more tax service system 150 can be iteratively updated as tax rates and/or tax laws change over time.

Financial institution systems 160A-160Z can include financial institution systems of parties to transactions that are supported by system 100. Parties to transactions supported by system 100 can include the payment receiving party, the payment sending party, a shipping service, and/or a government entity that is owed tax.

Manager system 110 can run various processes, including preparation and maintenance process 111, natural language processing (NLP) process 113, registration process 114, transaction proposal generating process 115, transaction completion process 116, and machine learning process 117.

Data Repository 112 of manager system 110 can store various data. In users area 2121 data repository 112 can store data on various users of system 100. Users of system 100 can include, e.g. registered users and unregistered users. Unregistered users can be, e.g. guest users who are recognized by system 100 to interact with registered users of system 100. In credentials area 2122 of users area 2121 there can be stored data on users of system 100. Credentials area 2122 can include user ID and passwords of registered users, user IDs of guest users. In locations area 2123 of users area 2121 there can be stored historical data on the locations of users of system 100, including registered users and unregistered users. Manager system 110 can be operative to track the locations of all users of system 100 over time, and such data can be stored in location area 2123 and can be associated to user IDs assigned to registered and unregistered users of system 100. In preferences area 2124, data repository 112 can store data on preferences of users of system 100, including registered users and unregistered users.

Manager system 110 can be operative to iteratively examine data of social media system 130 and to discern preferences, e.g. likes and favorites of users based on content of social media system 130. Manager system 110 can iteratively examine content of social media system 130 to iteratively update preferences of users in preferences area 2124 over time so that data of preferences area 2124 changes as behavior patterns of users change over time. In decision data structures area 2125 data repository 112 can store various decision data structures for use by manager system 110 in returning action decisions. Decision data structures area 2125 can include, e.g. location shipping knowledgebase 2126 and location tax knowledgebase 2127.

Location shipping knowledgebase 2126 can cognitively map location data, e.g. sender and receiver location data to cost data associated to one or more shipping service. For example, where a receiving party is in a first location, query of location shipping knowledgebase 2126 can return a first shipping cost and where a receiving party is in a second location, query of location shipping knowledgebase 2126 can return a second shipping cost. Embodiments herein recognize that shipping costs can be variable based on a location of a sending party and a receiving party.

Location tax knowledgebase 2127 of decision data structures area 2125 can cognitively map locations of users, e.g. sending and receiving parties to tax rates associated to a proposed transaction. Embodiments herein recognize that ecommerce based transactions can be subject to taxation by different governments, e.g. state governments and/or federal governments in different jurisdictions and that tax rates and tax laws can iteratively change over time. In some scenarios, a government at a sending location might be owed tax. In some embodiments a government at a receiving location might be owed tax and in some embodiments, neither a government at a sending location or a receiving location might be owed tax, and still in other embodiments both a government at a sending location and a receiving location might be owed tax.

Manager system 110 can be configured so that data of location to shipping knowledgebase 2126 and location to tax knowledgebase 2127 are iteratively updated over time to iteratively include new and updated data, e.g. as shipping rates change (for location shipping knowledgebase 2126) or as tax schedules changes (for updated location tax knowledgebase 2127). For updating of location shipping knowledgebase 2126, manager system 110 can iteratively query one or more shipping service system 140 for updating data of location tax knowledgebase 2127, manager system 110 can iteratively query data of one or more of tax services system 150.

Data repository 112 in transaction templates area 2128 can store one or more transaction template. The transaction templates stored in transaction templates area 2128 can include a baseline cost area, e.g. for holding data on a cost of an item and can also include one or more variable data area. The one or more variable data can include, e.g. a shipping cost variable data area, one or more variable data area can include in addition or alternatively one or more variable tax data area. According to a process for generating a transaction proposal, manager system 110 can select an appropriate template from transaction templates area 2128. An appropriate transaction template can be selected, e.g. based on a location of a sending party and/or a receiving part. For example, different taxation schemes may apply based on a location of a sending party and/or a receiving party.

Manager system 110 running registration process 114 can register a user of system 100 as an owner of a payment URL as set forth herein. In response to being registered as an owner of a payment universal resource locator (URL) a user of system 100 can send to a second user registered payment URL in response to activating the received payment URL, by the second user, a browsing session can be commenced in which the second user can authorize an electronic payment to the first user.

Manager system 110 running transaction proposal generating process 115 can generate a transaction proposal on behalf of a user owner of a registered payment URL. Manager system 110 running transaction proposal generating process 115 can generate transaction proposal data based on location data of a second user who has activated the payment URL of a first user. Manager system 110 running transaction proposal generating process 115 can use, e.g. current location data of the second user, and/or location history data of the second user in generating transaction proposal data. Manager system 110 running transaction proposal generating process 115 can use one or more of location shipping knowledgebase 2126 and/or location tax knowledgebase 2127, e.g. according to one embodiment can use data returned from location shipping knowledgebase 2126 and/or location tax knowledgebase 2127 to fill in variable transaction data of a transaction template obtained from transaction templates area 2128.

Manager system 110 running transaction completing process 116 can complete a transaction in response to a transaction authorization received from a second user who is interacting with a first user who is the owner of a registered payment URL as set forth herein.

Manager system 110 running machine learning process 117 can employ machine learning processes, e.g. with use of predictive models and/or reinforcement models to iteratively improve action decision returned by system 100 over time for improved performance of returned action decisions.

Manager system 110 running NLP process 113 can include manager system 110 running processes on unstructured data. Manager system 110 running NLP process 113 can include manager system 110 running processes on unstructured data, e.g. unstructured text, audio, and/or video data to perform e.g. word segmentation, part of speech tagging, parsing, sentence breaking, and/or stemming. Manager system 110 running NLP process 113 can include manager system 110 running processes on unstructured data, e.g. unstructured text, audio, and/or video data to return one or more NLP output parameter can include, e.g. a topic parameter and/or a sentiment parameter. A sentiment parameter can be a bipolar sentiment parameter, e.g. a positive sentiment or a negative sentiment or can be a sentiment specifying one of multiple types of possible non-bipolar sentiments, e.g. "anger", "disgust", "fear", "sadness", and/or "joy". Manager system 110 can run NLP process 113, e.g. to examine social media data of registered and unregistered users to determine, e.g. topics of interest of the registered users and based on the topics of interest can associate favorite topics to users of system 100 having IDs in users area 2121 of data repository 112.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Figure 2:
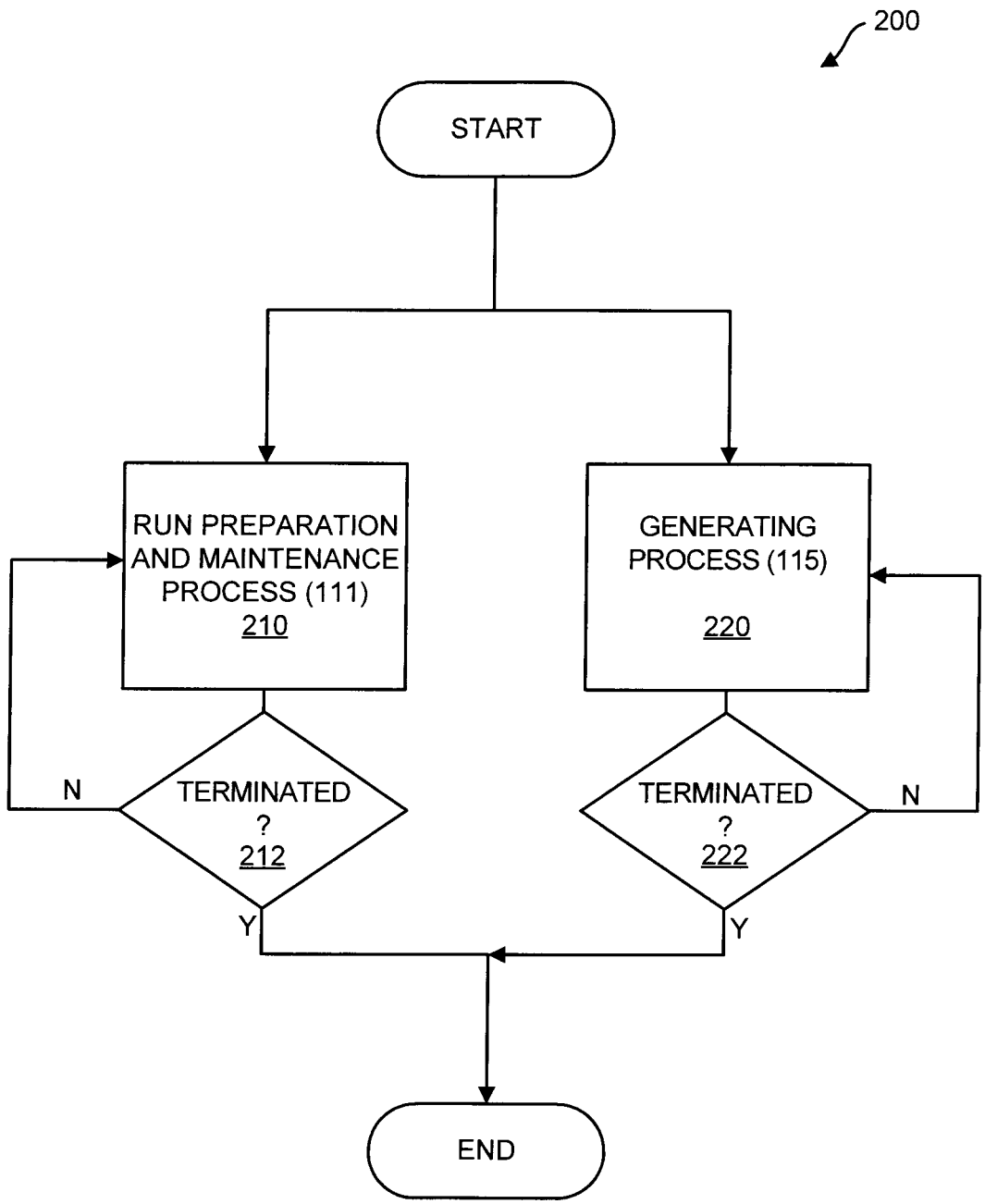
FIG. 2 is a flowchart depicting a method that can be performed by a manager system according to one embodiment.

FIG. 2 is a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of areas 2121-2128. Manager system 110 can run preparation and maintenance process 111 iteratively until process 111 is terminated at block 212.

At block 220, manager system 110 can run transaction proposal generating process 115 to determine a transaction proposal. For support of running of transaction proposal generating process 115 iteratively, manager system 110 can be running e.g. NLP process 113 and/or machine learning process 117 iteratively. Manager system 110 can run transaction proposal generating process 115 until transaction proposal generating process 115 is terminated at block 222. Manager system 110 can run preparation and maintenance process 111 and transaction proposal generating process 115 concurrently and can run each of process 111 and process 115 iteratively.

Figure 3:
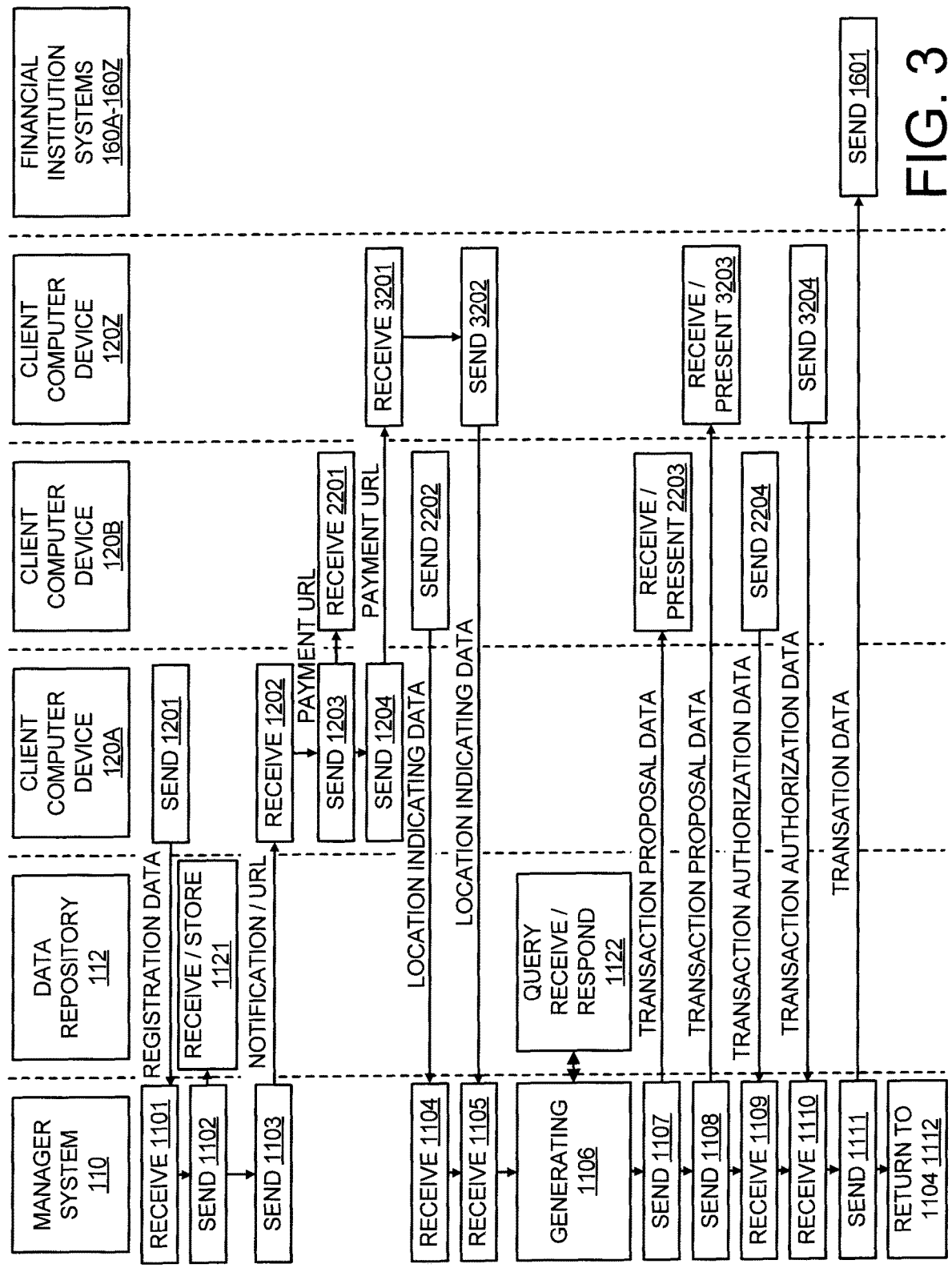
FIG. 3 is a flowchart depicting a method that can be performed with a manager system interoperating with client computer devices and financial institution systems according to one embodiment.

Additional features of system 100 are set forth in reference to the flowchart of FIG. 3, which describes manager system 110 interoperating with client computer devices 120A, 120B, 120Z, and financial institution systems 160A-160Z. Referring to the flowchart of FIG. 3, client computer device 120A at block 1201 can send registration data to manager system 110 for receipt by manager system 110 at block 1101. According to one embodiment, a user of client computer device 120A can already be a registered user of an electronic payment support service provided by manager system 110 and may wish to upgrade to become a registered user of an extended service wherein the user, e.g. Amy, of client computer devices 120A can send registered payment URLs to other users of system 100, who may be registered or unregistered users of system 100. For defining and sending registration data at block 1201 a user, e.g. Amy, of client computer device 120A can be using a registration user interface 400 as set forth in FIG. 4.

Figure 4:
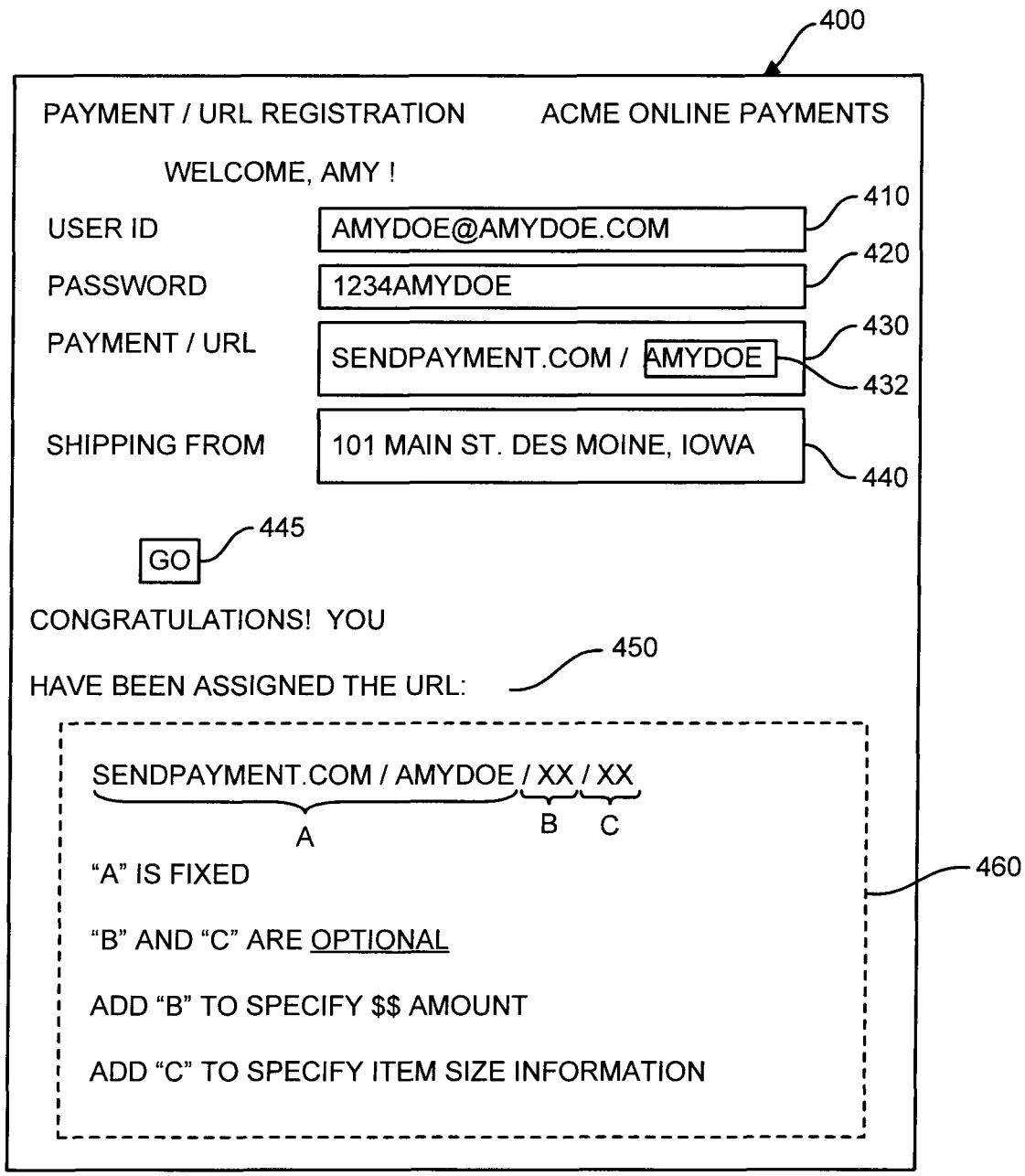
FIG. 4 depicts a user interface that can be displayed on a client computer device according to one embodiment.

Payment URL registration user interface 400 as illustrated in FIG. 4. In area 405, a text based greeting can be presented to the user, e.g. in this case Amy. In area 410 the user can enter a user ID which can be the registered user ID of the user that permits the user to use electronic payment services provided by manager system 110 that allows a user to make web based electronic payments to other users and to receive web based electronic payments from other users. Manager system 110 can be configured to facilitate and support online money transfer that serve as an electronic alternative to traditional paper methods like checks and money orders. Manager system 110 can facilitate the acceptance of electronic payment for online transactions. Manager system 110 can be compliant with various standards for electronic data interchange (EDI). For example, manager system 110 can be compliant with EDI standards X12, EDI FACT, and ODETTE. Manager system 110 can facilitate payments and money transfers in network 180. In area 420, the user of client computer device 120A, Amy can input a password associated to Amy's account with manager system 110. In areas 430 and 432 continuing with the described example, Amy can input a requested registered payment URL for later use by Amy in receiving payment from others such as other users of system 100 including registered and unregistered users. In area 430 there can be displayed a homepage URL text descriptor, e.g. sendpayment.com in the described example and in area 432, Amy can specify a first subpage descriptor. Area 432 can be a variable data area that holds variable data that can be defined by Amy. Any text string can be specified in area 432.

In the described example described with reference to FIG. 4, Amy can input the text string, Amy Doe. In area 440 Amy can input a shipping from location of Amy, i.e. the location from which Amy can ship products. User interface 400 can be adapted to accommodate alternative "shipping from" locations. For example, area 440 can include a drop down menu that allows Amy to select one of a candidate set of "shipping from" locations. Each candidate "shipping from" location can be a different shipping warehouse according to one embodiment. In some embodiments, manager system 110 can be configured to auto-select a best "shipping from" location from a set of candidate shipping warehouses based on which candidate "shipping from" locations is most proximate to a "shipping to" location. On activation of go button 445, manager system 110 can register a requested payment URL for Amy. According to one embodiment, user interface 400 can be a displayed user interface defined by a webpage served by manager system 110 and opened and displayed with use of a browser program running on client computer device 120A used by Amy. In response to receiving registration data at block 1101, manager system 110 can proceed to blocks 1102 and 1103 with further reference to the flowchart of FIG. 3.

At block 1102, manager system 110 can send registration data to data repository 112 for receipt by data repository 112 at block 1121. In response to the receipt of data at block 1121, manager system 110 can update users area 2121 to reflect that Amy is now a registered user of the extended payment URL service provided by manager system 110 and can update credentials area 2122 of users area 2121 to specify the newly registered payment URL registered to Amy. Which newly registered payment URL can be associated Amy's user ID and password, namely AmyDoe@amydoe.com and the password 1234AmyDoe. Manager system 110 at block 1103 can send notification data with a notification of the newly registered URL to client computer device 120A of Amy, for receipt by client computer device 120A at block 1202. On receipt of notification data at block 1202, client computer device 120A of Amy can display the text based data of area 450 and 460 of user interface 400 as shown in FIG. 4. Namely, in area 450 a confirmation text based message can be displayed on a display of client computer device 120A of Amy. In area 460 user interface 400 can display the new payment URL that has been newly registered to Amy and can also provide text based descriptors that describe best use aspects of the newly registered payment URL to Amy. In area 460, user interface 400 can display Amy's newly registered payment URL as set forth in (1) below.

sendpayment.com/amydoe/xx/xx (1)

Referring to area 460 of user interface 400 area 460 can provide descriptive text based data describing best use practices associated with Amy's newly registered payment URL. Referring to FIG. 4, the text based descriptive information can specify for example, that Amy's payment URL includes a fixed content section and a variable content section. It is shown in FIG. 4 that the fixed content section of Amy's payment URL is the content specifying a root directory page and a first tier subpage. The specified fixed content section of Amy's payment URL is the URL "sendpayment.com/amydoe".

Descriptive area 460 can also specify that Amy's assigned URL can include a first fixed content section A and second and third optional and variable data content sections B and C. The content sections B and C that are specified within descriptive area 460 depicted in FIG. 4 can be specified to be optional variable content sections. The depicted section B is described as being an optional variable data content section of Amy's URL and the section C is described as being an optional variable data content section. Descriptive area 460 can specify as shown in the example of FIG. 4 that content sections B and C are merely optional and variable by Amy and can be used by Amy where Amy wishes to make use of extended services available for manager system 110. The descriptive area 460, can specify that the optional variable data content section B can be used by Amy to specify a dollar amount and that the that the optional variable data content section C can be used by Amy to specify item size information, e.g. the size information specifying the size of the item being shipped by Amy for payment. Additional descriptive information available on user interface 400 can describe for example that Amy's registered payment URL can be used absent of the optional variable data content section B and C in the case that Amy wishes to send a generic URL payment link to a user of system 100 that allows the receiver user to enter any payment amount to Amy, but can use optional variable data content section B to specify a payment amount and/or can use optional variable data content section C to specify an item size.

System 100 can be configured so that a user can use area 460 to define additional optional variable data content sections, e.g. variable data sections D and E following variable data section C. Optional variable data content section D can be used to specify delivery speed, e.g. can specify that the delivery is to be same day, overnight, two day, three day, or N day. Optional variable data content section D can be used to specify the carrier performing delivery, e.g. can specify a government carrier (e.g. USPS®), a first private enterprise carrier, or a second government enterprise carrier (e.g. UNITED PARCEL SERVICE® and FEDEX®). USPS® is a registered trademark of the United States Postal Service, UNITED PARCEL SERVICE® is a registered trademark of United Parcel Service of America, Inc. and FEDEX® is a registered trademark of FEDEX Corporation. Descriptive area 460 can specify as shown in the example of FIG. 4 in respect to content section B and C that content sections D and E are merely optional and variable by Amy and can be used by Amy where Amy wishes to make use of extended services available for manager system 110. In the absence of content sections D and E being configured default values for delivery speed and carrier service can be used. The default values can be configured by Amy using another area of user interface.

There is set forth herein according to one embodiment, registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user; and examining location data of the second user in response to activation of the payment URL by the second user and determining one or more variable data values in dependence on the location data of the second user. wherein the registering a payment URL to the first user includes registering the payment URL so that the payment URL has first, second and third variable content fields, wherein the first variable content field specifies a size of an item for shipment from the first user to the second user in terms of one or more of the following selected from the group consisting of weight and dimensions, and wherein the determining the one or more variable data values is in dependence on the location data of the second user and in dependence on the item size specified in the first variable content field, wherein the registering a payment URL to the first user includes registering, wherein the second variable content field specifies a carrier service selected from the group consisting of a government carrier service, a first private enterprise carrier service and a second private enterprise carrier service, and wherein the determining the one or more variable data values is in dependence on the location data of the second user and in dependence on the carrier service specified in the second variable content field, wherein the third variable content field specifies a carrier service selected from the group consisting of a government carrier service, a first private enterprise carrier service and a second government enterprise carrier service, and wherein the determining the one or more variable data values is in dependence on the location data of the second user and in dependence on the carrier service specified in the third variable content field.

Continuing with reference to the flowchart of FIG. 3, client computer device 120A in response to configuration data defined by Amy at blocks 1203 and 1204 can send payment URLs to client computer device 120B for receipt by client computer device 120B at block 2201 and can send at block 1204 a payment URL to client computer device 120Z for receipt by client computer device 120Z at block 3201. Continuing with the described example, client computer device 120B can be a client computer device being used by Bob and client computer device 120Z can be a client computer device being used by Zach. Client computer devices 120A of Amy can send payment URLs to other users at blocks 1203 and 1203 using a messaging system of system 100. Such as a messaging system provided by social media system 130 or a messaging system provided by manager system 110.

Continuing with reference to the flowchart of FIG. 3, client computer device 120B at block 2202 can send location indicating data for receipt by manager system 110 at block 1109 and client computer device 120Z at block 3202 can send location indicating data to manager system 110 for receipt by manager system 110 at block 1105. The sending of location indicating data by client computer device 120B at block 2202 can be in response to Bob clicking on Amy's transmitted payment URL received at block 2201. The sending of location indicating data by client computer device 120Z at block 3202 can be in response to Zach clicking on Amy's payment URL received by client computer device 120Z at block 2201.

Figure 5:
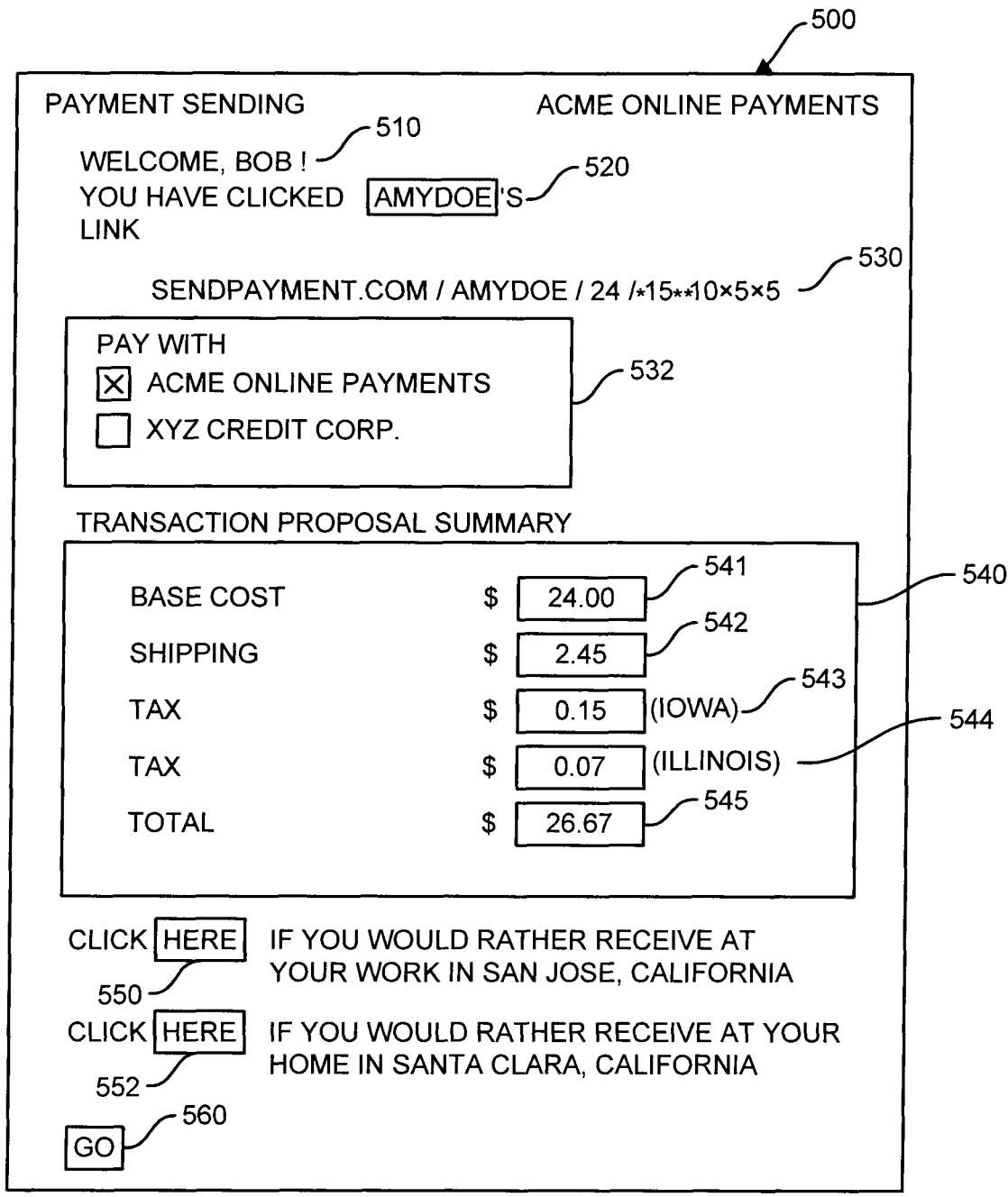
FIG. 5 depicts a user interface that can be displayed on a client computer device according to one embodiment.

Referring to further features of system 100, FIG. 5 depicts payment sending user interface 500 displayed on a display of client computer device 120B being used by Bob. In area 510 user interface 500 can display a greeting to Bob. In area 520 user interface 500 can display a text based specifier confirming that Bob has clicked Amy Doe's payment URL. In area 530 user interface 500 can display defining text defining the URL sent by Amy and clicked on by Bob. In the described example area 530 presents Amy's URL as follows: sendpayment.com/amydoe/24/*15**10×5×5. In the described example the particular payment URL used by Amy indicates that Amy has used both the section A and B option content sections available to Amy in defining a payment URL.

Referring to area 530 of FIG. 5, the content section "24" in the second tier subpage area of Amy's URL indicates the dollar value of $24.00. Referring further to area 530 the text "*15**10×5×5" indicates that Amy has also use the optional section B content area available to Amy in defining Amy's payment URL as described in reference to FIG. 4. The text of area "*15**10×5×5" specifies according to one embodiment size information of an item to be shipped by Amy. Various data formats can be utilized, one possible data format option being indicated in reference to FIG. 5. With the data formatting option used in reference to area 530 of FIG. 5, data following a single "*" in optional item size content area of a URL can specify weight information, e.g. in grams or ounces, and text following a ** can specify dimensional information, e.g. in centimeters or inches, in height, width, and depth dimensions. Accordingly, the text descriptor in Amy's URL of area 530 of FIG. 5, namely the text "*15**10×5×5" can specify the weight 15 grams and the size dimension 10 cm high, 5 cm wide, and 5 cm in depth. Manager system 110 can be configured so that Amy can specify payment and/or item size and data in various formats including natural language format. For example, as an alternative to specifying the text string "*15**10×5×5" Amy can instead enter the text string data as follows "this_package_is_15_grams_and_has_a_dimension_and_is_10cm_high_is_5cm_wide_and_is_5cm_deep".

Amy's URL displayed in area 530 according to one example where the variable data content sections D and E are also used as set forth herein can be follows: sendpayment.com/amydoe/24/*15**10×5×5/overnight/UPS. In the described example "overnight" indicated shipping speed of "overnight" and "UPS" indicates the private enterprise carrier UPS®. According to one embodiment, Amy's registered URL can include human readable text based data provided in such format that that can be read and understood by the payment sender user without machine reading. That is a payment sender user can understand by human reading to the URL text string "sendpayment.com/amydoe/24/*15**10×5×5/overnight/UPS" that the item price is $24, that the weight has a value of 15, the dimensional values are 10×5×5 that the delivery speed is overnight and the carrier is the private enterprise carrier UPS®.

Manager system 110 can be configured to activate NLP process 113 to examine and discern size information input using a natural language format. In some embodiments, Amy can input weight information without inputting dimensional information. In some embodiments, Amy can specify dimensional information in a defined payment URL without specifying weight information.

Referring again to the flowchart of FIG. 3, manager system 110 at receive blocks 1104 and 1105 can receive location indicating data from client computer device 120B and client computer device 120Z. Location indicating data received at blocks 1104 and 1105 can include, e.g. GPS based location data as provided by client computer devices 120B and 120Z. Client computer devices 120B and 120Z can be equipped with GPS sensors that iteratively provided updated location data and such data can be reported at blocks 2202 and 3202 for receipt by manager system 110 at blocks 1104 and 1105 respectively. Alternatively, manager system 110 can receive location data specifying the locations for client computer devices 120A-120Z over time from a location service provider that utilizes data of network 180, e.g. triangulation based and/or time of flight based location data that can be provided by various resources of network 180 including, e.g. cellular service physical networks and/or IEEE 802.11 networks which can be included as part of the physical infrastructure defining network 180.

According to one embodiment location indicating data received at blocks 1104 and 1105 can be provided by IP addresses of client computer devices 120B and 120Z respectively. Manager system 110 on receipt of location indicating data at blocks 1104 and 1105 can activate a process for determining location of client computer devices 120B and 120Z based on respective IP addresses of client computer devices 120A and 120Z. Sample program code for the duration of locations of client computer devices 120B and 120Z based on IP addresses of client computer devices 120B and 120Z is set forth in the sample code set forth herein below in Table A.

TABLE A

```
$.get("http://ipinfo.io", function(response) [
  shopService.userCity = response.city; shopService.userState = response.region;
  shopService.userCountry = response.country;
  shopService.userZip = response.postal;
  var config = [
  headers: [
  "Content-Type": "application/JSON",
  "Authorization" : "Bearer"+shopService.userAuthkey
  },
  data: JSON.stringify(shopService.getRegistrationJson())
  };
```

On completion of blocks 1104 and 1105 manager system 110 can proceed to block 1106 to perform generating the transaction proposal. Performing block 1106 of flowchart of FIG. 3 can include manager system 110 activating transaction proposal generating process 115 set forth in reference to FIG. 1.

Figure 6:
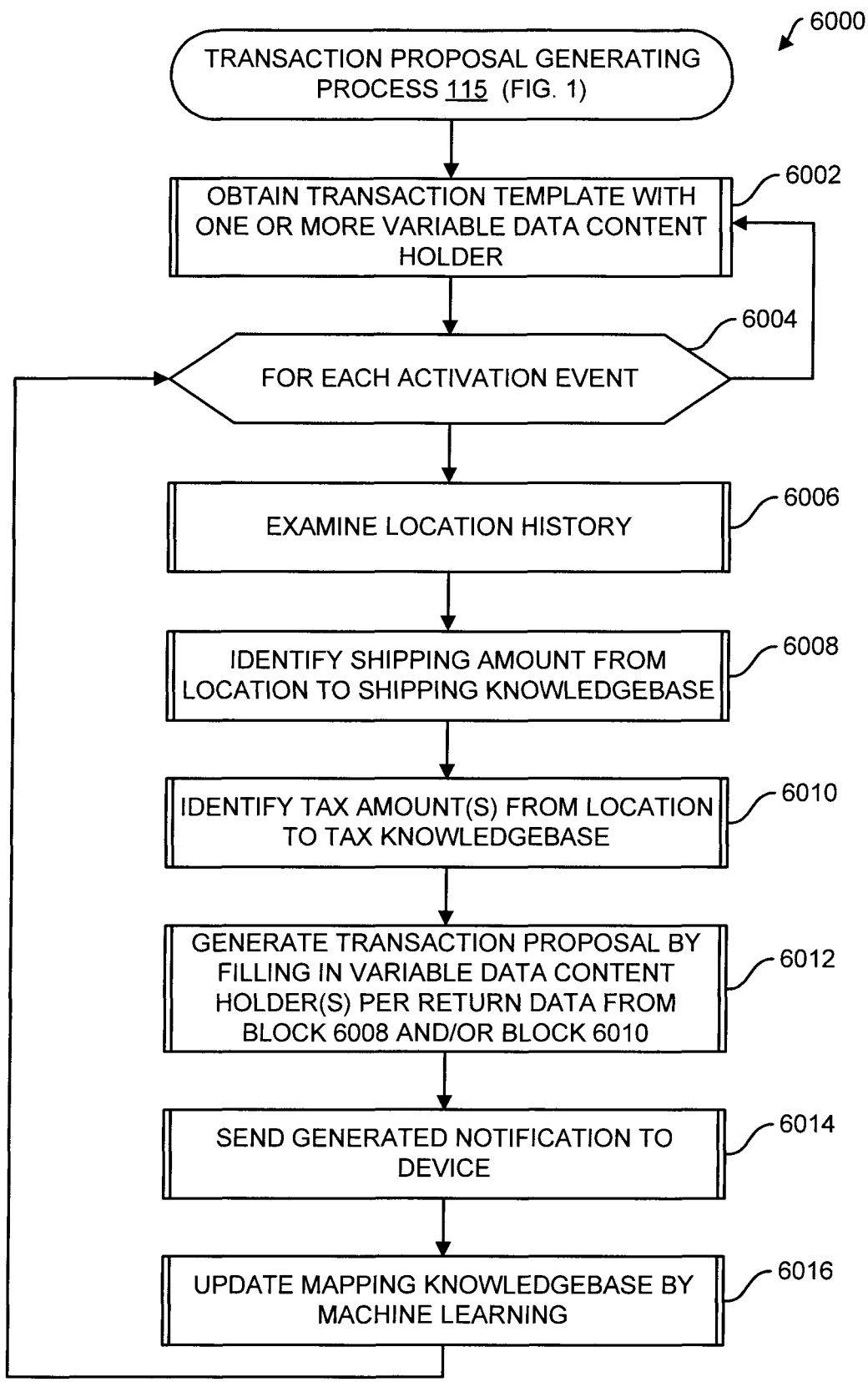
FIG. 6 depicts a method that can be performed by manager system according to one embodiment.
Figure 7:
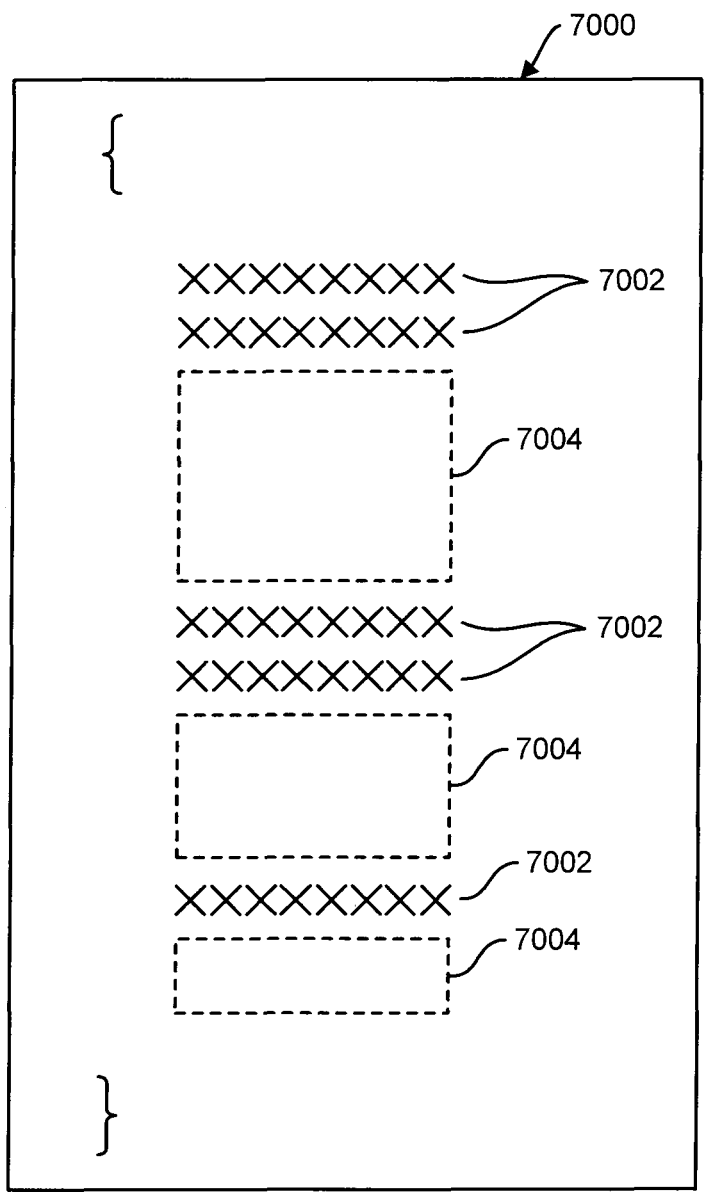
FIG. 7 depicts a text based markup language document that can serve as a transaction template according to one embodiment.

Manager system 110 performing transaction proposal generating process 115 according to one embodiment is described in reference to FIG. 6 illustrating a flowchart for performance of a transaction proposal generating process and FIG. 7 illustrating a transaction template that is filled in by running of a transaction proposal generating process according to one embodiment.

Referring to the flowchart of FIG. 6, manager system 110 at block 6002 can obtain the transaction template with one or more variable data content holder. Manager system 110 performing at block 6002 can obtain transaction template from transaction templates area 2128 of data repository 112. For selection of an appropriate template, manager system 110 according to one embodiment can examine the current location of a responding client computer device responding to receipt of a registered payment URL, e.g. by clicking on the URL or pasting the URL into a browser. Embodiments herein recognize that different transaction record templates can be valid or invalid based on respective locations of a sending and/or a receiving party, e.g. in view of tax practices in different jurisdictions.

FIG. 7 depicts a transaction template 7000 with one or more variable data content holder. As depicted in FIG. 7, the transaction template 7000 with one or more variable data content holder can be provided according to one embodiment by a markup language document having fixed data content areas and one or more variable data content holder areas. For example, can include fixed content area 7002 as depicted in FIG. 7 and one or more variable data content holder sections 7004 as depicted in FIG. 7.

In further reference to the flowchart of FIG. 6, manager system 110 for each response activation event (block 6004) can perform blocks 6006, 6008, 6010, 6012, 6014, and 6016 as depicted in the flowchart of FIG. 6. Response events referred to at block 6004 can be provided, e.g. by clicking on the payment URL or pasting the URL into a web browser by a user, e.g. Bob or Zach of respective client computer devices 120B and 120Z as depicted in the flowchart of FIG. 3 and the schematic block diagram of FIG. 1.

At block 6006 manager system 110 based on an occurrence of a response event can perform examining of a location of a client computer device, e.g. client computer device 120B associated to a response event. Examining location data of a client computer device at block 6006 can include examining a current location of a client computer device, and/or history of the prior locations of the client computer device as will be set forth herein. At block 6008 manager system 110 can identify a shipping amount for an item being shipping from location shipping knowledgebase 2126 of data repository 112. Location shipping knowledgebase 2126 of decision data structures area 2125 of data repository 112 can be provided by a relational database having a plurality of tables that associates shipping origination and destination locations to shipping prices. Based on return data returned by query from location shipping knowledgebase 2126, manager system 110 can identify a shipping cost amount associated with a current transaction proposal being prepared.

At block 6010, manager system 110 can identify tax amount(s) from a location tax knowledgebase 2127 of decision data structures area 2125 of data repository 112. Location tax knowledgebase 2127 can be provided, e.g. by a relational database having one or more table which can associate shipping origination and/or destination locations with tax rate values for use by manager system 110 in determining tax debt amounts associated with a current transaction proposal. Manager system 110 at block 6012 can generate a transaction proposal by filling in variable data content holder(s) for return data returned by performance of block 6008 and/or 6010. For example, with reference to the text based markup language document 7000 depicted in FIG. 7, manager system 110 at block 6012 can fill in with text based marked up language data one or more variable data holder area of text based markup language document 7000 providing a transaction template based on return data returned at block 6008 and/or 6010. The filled in template document filled in as explained with reference to FIGS. 6 and 7 can then be stored by manager system 110 into a proposal instances area of transaction templates area 2128 of data repository 112.

At block 6014 manager system 110 can send a generated notification to a client computer device associated with the response event, described in reference to block 6004. The generated notification can include text based data specifying a transaction proposal. An example of a text based notification specifying a transaction proposal is described with reference to payment sending user interface 500 as described in reference to FIG. 5. In area 540 of user interface 500, the filled in text based transaction data can be displayed in area 540. In area 541 user interface 500 can display a base cost of a transaction which can be data specified by Amy's payment URL making use of the optional variable content area A of Amy's payment URL described in reference to FIG. 4. In area 542 of user interface 500 there can be displayed a shipping cost value, e.g. as determined by manager system 110 performing data queries of location shipping knowledgebase 2126 as described in reference to block 6008 of the flowchart of FIG. 6. In area 543 there can be displayed a tax debt value owed to the sender location jurisdiction, e.g. in the case described, Iowa the location of Amy (sender). The tax debt value displayed in area 543 can be determined by manager system 110 querying location tax knowledgebase 2127 of decision data structures area 2125 of data repository 112 as explained with reference to block 6010 as described in reference to the flowchart of FIG. 6. In area 544 user interface 500 can display a text debt value owed to the receiver jurisdiction, e.g. in this case Illinois, the current location of Bob. The tax debt value displayed in area 544 can be determined by manager system 110 at block 6010 querying location tax knowledgebase 2127 of decision data structures area 2125 of data repository 112. In area 545 user interface 500 can display the total of values displayed in areas 541-544. It is noted in reference to examining location history block 6006 of the flowchart of FIG. 6, manager system 110 according to one embodiment, manager system 110 can examine a current location of a responding client computer device responding to a registered payment URL as well as history of prior locations of such responding client computer device. Manager system 110, according to one embodiment can be configured by default to use the current location of a responding client computer device, e.g. Bob's client computer device 120B in the described example described with reference to FIG. 5 as a shipping destination location. However, according to another embodiment an alternate destination location for shipping of an item can be used.

According to one embodiment manager system 110 at examining location history block 6006 can examine history locations of a responding user, e.g. in this case Bob, to ascertain one or more based location of Bob. A base location can be a location regularly visited by Bob at which Bob spends a considerable amount of time. Examples of base locations can include, e.g. a work location or a home location of Bob. Manager system 110 can discriminate between a work location and a home location of Bob based on the times of day spent at the respective base locations. For example, manager system 110 can designate a base location as a work location when it is a location routinely visited during the day and can designate a base location as a home location when it is a location that is customarily occupied during nighttime hours.

Manager system 110 according to one embodiment at block 1107 can sent transaction proposal data for receipt by client computer device 120B at block 2203 using Bob's current location (Chicago, Ill.) but at block 1106 can further determine that Bob is currently at a location (Chicago, Ill.) other than his work location (San Jose, Calif.) or his home location (Santa Clara, Calif.). Based on the determination at block 1106 that Bob is currently located at a location other than Bob's work or home location, manager system 110 can present control 550 and control 552 of payment sending user interface 500 to allow Bob to select to alternative shipping destination locations, that are determined to be base locations by manager system 110 processing of historical data of data repository 112. System 100 can be configured with reference to user interface 500 so that if Bob selects control 550, Bob can designate Bob's work location as the destination location for shipping in the current transaction and can be further configured so that if Bob activates control 552 Bob can select Bob's home location as a shipping destination in a current transaction. Based on Bob's selection of control 550 or control 552, manager system 110 can responsively reperform generating block 1106 to re-determine the variable data content holder values previously filled in at block 6002. In other words, manager system 110 can reperform blocks 6008 and/or 6010 as described in reference to the flowchart of FIG. 6 to re-query location shipping knowledgebase 2126 and/or location tax knowledgebase 2127 using the newly designated values for shipping destination selected by Bob based on manager system 110 determining Bob's work and home base locations by processing of location history data for Bob at block 6006. It will be understood with reference to user interface 500 that based on Bob selecting an alternative shipping destination location using control 550 or control 552, manager system 110 will present alternatively determined values in areas 542-545 of user interface 500 based on the newly designated destination location.

Referring further to the flowchart of FIG. 3, manager system 110 on completion of generating block 1106 can proceed to blocks 1107 and 1108. At block 1107 manager system 110 can send transaction proposal data to client computer device 120B for receipt by client computer device 120B at block 2203 and at block 1108 manager system 110 can send transaction proposal data to client computer device 120Z for receipt by client computer device 120Z at block 3203. In response to the receipt of transaction proposal data at block 2203, client computer device 120B can present the transaction proposal data, e.g. as depicted and described in reference to area 540 of user interface 500 (FIG. 5).

In response to receipt of transaction proposal data at block 3203, client computer device 120Z can responsively present such transaction proposal data, e.g. configured according to area 540 of FIG. 5, that is displayed on client computer device 120Z used by Zach. It will be understood that Zach's client computer device 120Z can display a user interface according to user interface 500 as described in reference to FIG. 5, except that certain data fields will be differentiated and customized in view of the transaction proposal being prepared for Zach and not Bob. For example, according to one embodiment, Zach's current location can be Miami, Fla. and not Chicago, Ill.

Referring to the flowchart of FIG. 3 at blocks 1108-1109 manager system 110 can contemporaneously receive response data from client computer devices 120B and 120Z, e.g. both Bob and Zach can contemporaneously click on Amy's payment URL within seconds or minutes of one another. Manager system 110 on receipt of respective location indicating data at blocks 1104 and 1105 can contemporaneously perform generating at block 1106 for both Bob and Zach. Generating at block 1106 can include multiple queries of data of data repository 112 as indicated by query receive and respond block 1122 performed by data repository 112. Based on the current locations of Bob and Zach respectively, generating at block 1106 can be performed differently by manager system 110 for Bob as compared to Zach.

Performing block 6008 for Zach, manager system 110 can return shipping amount data based on Zach's current location (Miami, Fla.) that is different from the return data, returned based on Bob's current location (Chicago, Ill.). At block 6010, tax amounts returned for Zach can be returned to have different values from the tax amount values returned for Bob based on Zach having a different current location (Miami, Fla.) that is different from Bob's current location (Chicago, Ill.). Accordingly, at blocks 1107 and 1108, manager system 110 can contemporaneously send respective user interfaces according to user interfaces 500 (FIG. 5) to each of Bob and Zach wherein the displayed data of area 540 of user interface 500 is displayed differently for Zach as compared to Bob based on the different current locations of Zach (Miami, Fla.) and Bob (Chicago, Ill.) respectively.

Referring further to user interface 500 of FIG. 5 user interface 500 can include go control 560. On activation of go control 560 by Bob, client computer device 120B at block 2204 can send transaction authorization data to manager system 110 for receipt by manager system 110 at block 1109. On activation of go control 560 by Zach, client computer device 120Z at block 3204 can send transaction authorization data to manager system 110 for receipt by manager system 110 at block 1110. In response to the receipt of transaction authorization data by manager system 110 at blocks 1109 and 1110, manager system 110 can proceed to block 1111. At block 1111 manager system 110 can activate transaction completion process 116 (FIG. 1).

For performing transaction completion process 116 manager system 110 at block 1111 can send authorized transaction data for receipt by financial institution systems 160A-160Z at block 1601. In response to receipt of the authorized transaction data at block 1601, financial institution systems of financial institution systems 160A-160Z can perform appropriate crediting and debiting of account balances, based on the received transaction data, e.g. with reference to the described example can credit Amy's account balance by an amount $24.00 as specified by Amy when Amy defined Amy's payment URL and can debit both Bob and Zach's account balances by that same amount. The relevant financial institution systems of financial institution systems 160A-160Z can further credit one or more shipping service account balance by the amount specified in area 542 of the respective user interfaces 500 of Bob and Zach and can also increase various government account balances by the amount specified in areas 543 and 544 in the respective user interface 500 of Bob and Zach. Since Zach's version of area 544 can specify Florida rather than Illinois and can specify a tax amount for Florida rather than a tax amount for Illinois. On completion of block 1111 manager system 110 can proceed to block 1112 at which manager system 110 can return to block 1104.

With further reference to features set forth herein, it will be understood that system 100 can be provided to include a reduced combination of features or an increased set of features relative to specific embodiments herein. For example, skilled artisans will appreciate that system 100 can provide important advantages where shipping cost related features are provided in the absence of tax cost related features or where system 100 is provided in embodiments that provide described tax cost features in the absence of shipping cost related features.

Manager system 110 running machine learning process 117 can include manager system 110 automatically over time adding to the corpus of data stored in various areas of data repository 112 including areas 2121-2128. By maintaining a growing and evolving corpus of data stored in data repository 112 manager system 110 is able to improve its decision making processes over time and to adapt decision making processes in view of, e.g. changing behaviors of users of system 100 and also to accommodate system 100 so that system 100 can accurately provide services to new users. Manager system 110 running machine learning process 117 can perform other processes. According to one example, manager system 110 can iteratively train a reinforcement model that iteratively evaluates the accuracy of decision data structures 2125 such as location to shipping knowledgebase 2126 and location to tax knowledgebase 2127 in return of data such as shipping cost values and tax cost values. For example, by training of such reinforcement model by machine learning processes, manager system 110 can learn over time that a certain user such as Bob may prefer to receive shipment of items at his work location rather than his current location and/or that Zach may prefer to receive shipment of items at his current location. Thus, action decisions returned with use of decision data structures of decision data structures area 2125 can be iteratively updated over time by machine learning processes.

Certain embodiments herein can offer various technical computing advantages involving computing advantages to address problems in the realms of computer networks and systems, including computer networks and systems operating to provide location based services (LBS). Embodiments herein can provide enhanced user interface functionality which causes a computer system to respond differently in dependence on automatically sensed locations of users in the absence of express user interface controls being entered into a user interface of a computer system. Embodiments herein can employ various decision data structures for use in driving artificial intelligence (AI) decisions. Decision data structures set forth herein can include location shipping knowledgebase decision data structure and a location tax knowledgebase decision data structure. Such decision data structures can be automatically and iteratively updated. Decision data structures as set forth herein can be updated by machine learning so that accuracy and reliability is iteratively improved over time without resource consuming rules intensive processing. Machine learning processes can be performed for increased accuracy and for reduction of reliance on rules based criterion and thus reduced computational overhead. For enhancement of computational accuracies, embodiments can feature computational platforms existing only in the realm of computer networks and computer systems, such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users, in which can employ alternative processes for locating users such as examination of IP addresses of users. Embodiments herein can include artificial intelligence processing platforms featuring improved processes to transform unstructured data into structured form permitting computer based analytics and decision making. Embodiments herein can feature consolidated processing of transactions so that transactions can be settled with a reduced, e.g. single user interface session to complete a variety of transaction components including, e.g. a base cost component, a shipping component, and a tax component in a single transaction to avoid processing requirements associated with multiple transaction components being processed separately. Resource consumption accordingly can be significantly improved. A fundamental aspect of the operation of a computer system is its interfacing with external entities which can include machine entities or human entities. Accordingly, in one aspect improved computing processes featuring AI platforms can be provided that increase relevancy and accuracy of notifications to users. Thus, improving interactions between computer system and a user and increasing the likelihood of a human user remaining engaged in interactions that are driven by the computer system. Embodiments herein can provide location based services (LBS) so that alternative and different responses are provided to users based on their current location and/or based on a history of locations of system users.

Figure 8:
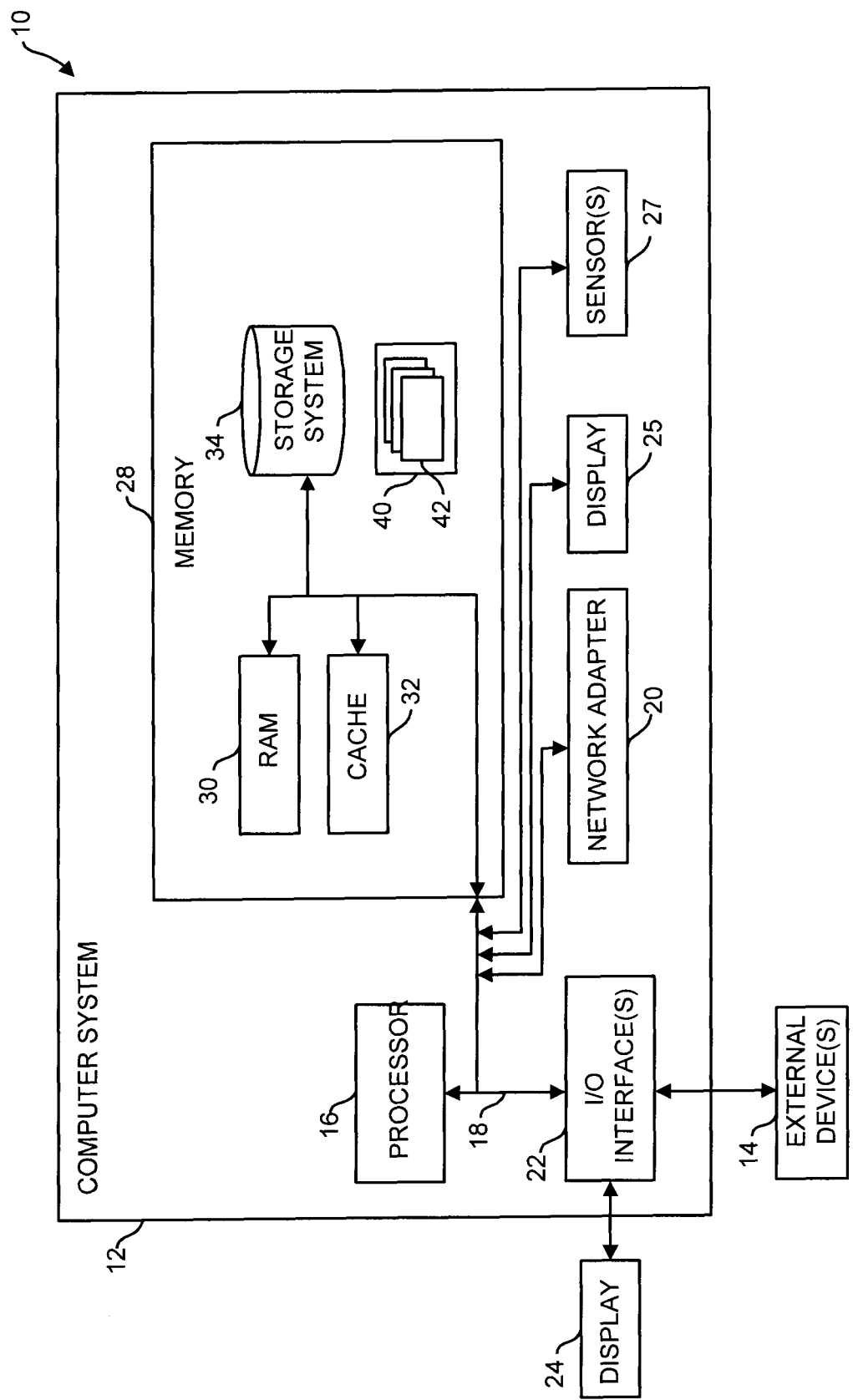
FIG. 8 depicts a computing node according to one embodiment.
Figure 9:
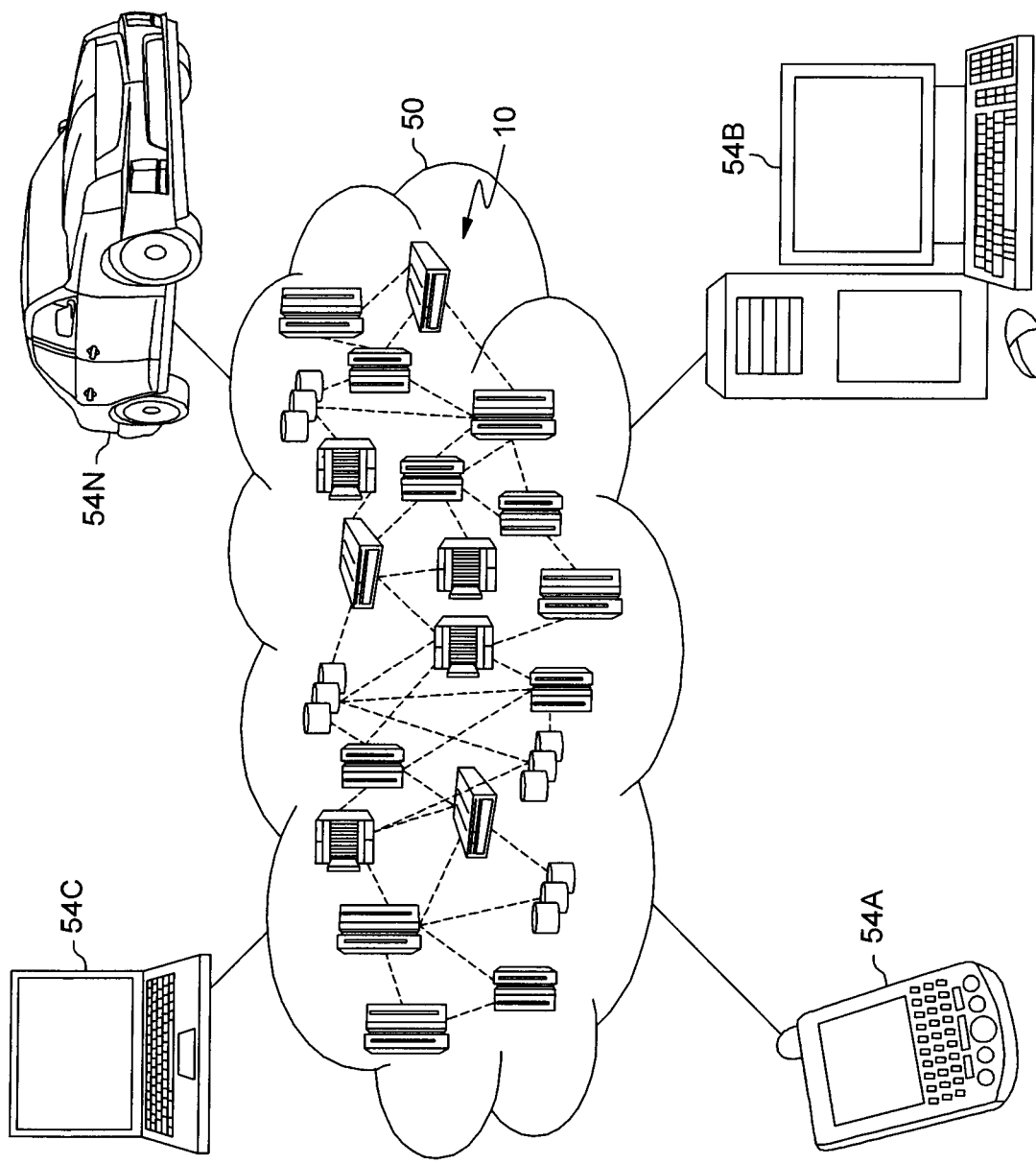
FIG. 9 depicts a cloud computing environment according to one embodiment.
Figure 10:
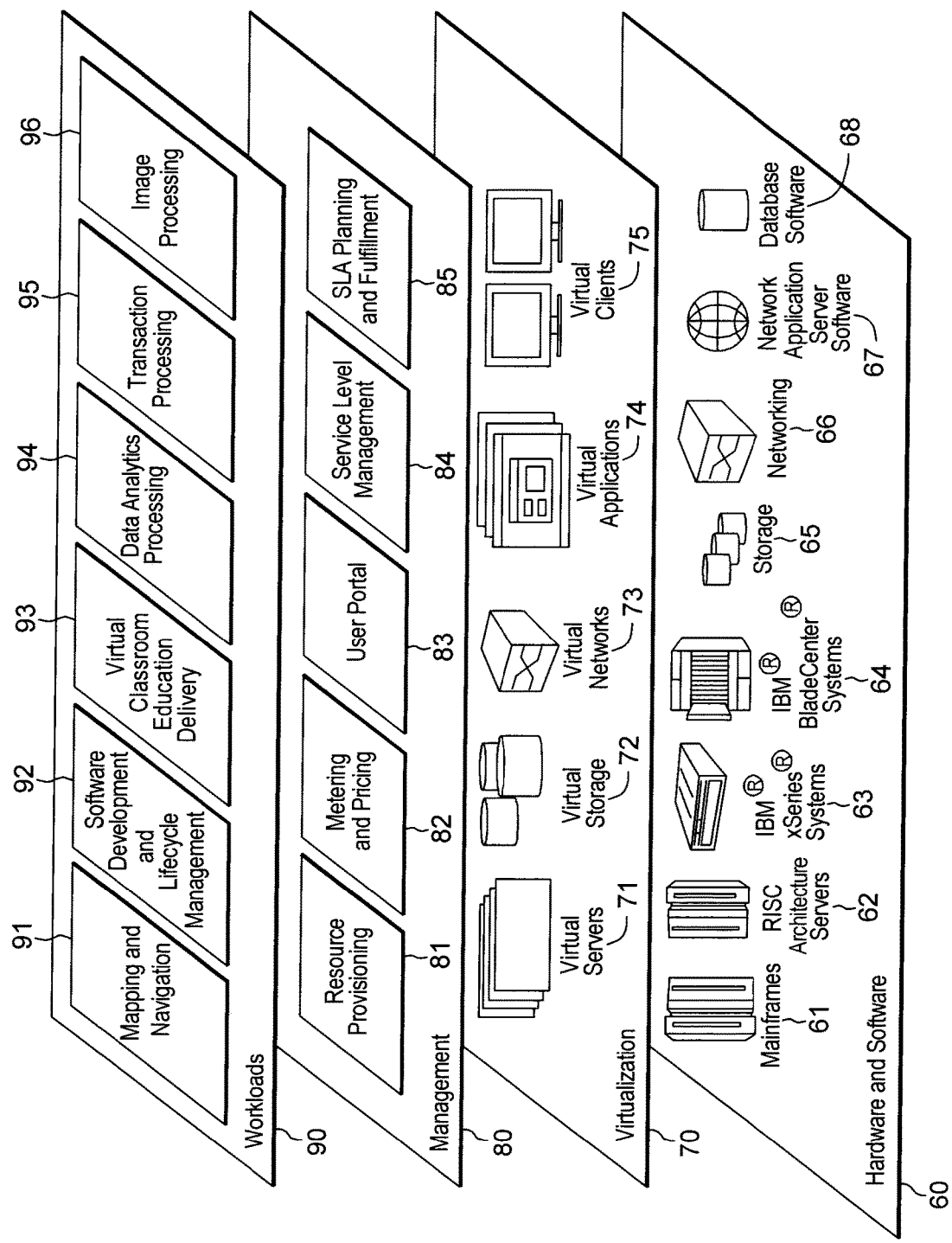
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 200 of FIG. 2, functions described with reference to method 6000 of FIG. 6 and functions described with reference to manager system 110 as set forth in the flowchart of FIG. 3. In one embodiment, one or more client computer device 120A-120Z can include one or more computing node 10 and can include one or more program 40 for performing functions described with reference to one or more client computer device 120A-120Z as set forth in the flowchart of FIG. 3. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing transactions as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed:

1. A method comprising:

registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user;

examining location data of the second user in response to activation of the payment URL by the second user and determining one or more variable data values in dependence on the location data of the second user;

generating transaction proposal data using the one or more variable data values;

sending the transaction proposal data to the second user for approval; and in response to receiving the approval from the second user completing a payment transaction defined by the transaction proposal data, wherein the examining location data of the second user includes examining current location data of the second user and wherein the determining one or more variable data values in dependence on the location data of the second user, includes determining the one or more variable data values in dependence on a current location of the second user, wherein the current location data includes Global Positioning System (GPS) based data, and wherein the method includes resolving the GPS based data into a shipping address.

2. The method of claim 1, wherein the determining one or more variable data values includes using a location to shipping cost mapping knowledgebase to return shipping cost information, wherein one or more variable data field of the transaction proposal data includes the shipping cost information.

3. The method of claim 1, wherein the determining one or more variable data values includes using a location to tax mapping knowledgebase to return tax information, wherein one or more variable data field of the transaction proposal data includes the tax information.

4. The method of claim 1, wherein the registering a payment URL to the first user includes registering the payment URL so that the payment URL has a certain variable content field, wherein the variable content field specifies a size of an item for shipment from the first user to the second user, and wherein the determining the one or more variable data values is in dependence on the location data of the second user and in dependence on the item size specified in the variable content field.

5. The method of claim 1, wherein the registering a payment URL to the first user includes registering the payment URL so that the payment URL has a certain variable content field, wherein the variable content field specifies a size of an item for shipment from the first user to the second user in terms of one or more of the following selected from the group consisting of weight and dimensions, and wherein the determining the one or more variable data values is in dependence on the location data of the second user and in dependence on the item size specified in the variable content field.

6. The method of claim 1, wherein the registering a payment URL to the first user includes registering the payment URL so that the payment URL has a certain variable content field, wherein the variable content field specifies a shipping speed for shipment from the first user to the second user in terms of one or more of the following selected from the group consisting of overnight delivery and two day delivery, and wherein the determining the one or more variable data values is in dependence on the location data of the second user and in dependence on the shipping speed specified in the variable content field.

7. The method of claim 1, wherein the registering a payment URL to the first user includes registering the payment URL so that the payment URL has a certain variable content field, wherein the variable content field specifies a carrier service selected from the group consisting of a government carrier service, a first private enterprise carrier service and a second private enterprise carrier service, and wherein the determining the one or more variable data values is in dependence on the location data of the second user and in dependence on the carrier service specified in the variable content field.

8. The method of claim 1, wherein the registering a payment URL to the first user includes registering the payment URL so that the payment URL has first, second and third variable content fields, wherein the first variable content field specifies a size of an item for shipment from the first user to the second user in terms of one or more of the following selected from the group consisting of weight and dimensions, and wherein the determining the one or more variable data values is in dependence on the location data of the second user and in dependence on the item size specified in the first variable content field, wherein the registering a payment URL to the first user includes registering, wherein the second variable content field specifies a carrier service selected from the group consisting of a government carrier service, a first private enterprise carrier service and a second private enterprise carrier service, and wherein the determining the one or more variable data values is in dependence on the location data of the second user and in dependence on the carrier service specified in the second variable content field, wherein the third variable content field specifies a carrier service selected from the group consisting of a government carrier service, a first private enterprise carrier service and a second government enterprise carrier service, and wherein the determining the one or more variable data values is in dependence on the location data of the second user and in dependence on the carrier service specified in the third variable content field.

9. The method of claim 1, wherein the examining location data of the second user includes examining historical location data of the second user and wherein the determining one or more variable data values in dependence on the location data of the second user includes determining the one or more variable data values in dependence on determined base location of the second user as determined by the examining, the base location being selected from the group consisting of a work location of the second user and a home location of the second user.

10. The method of claim 1, wherein the method includes, contemporaneously with the examining location data of the second user in response to activation of the payment URL by the second user, examining location data of a third user in response to activation of the payment URL by the third user and determining for use in providing a transaction proposal to the third user one or more variable data values in dependence on the location data of the third user; generating third user transaction proposal data for sending to the third user using the one or more variable data values determined by the examining location data of the third user; sending the third user transaction proposal data to the third user for approval; and in response receiving the approval from the third user completing a payment transaction defined by the third user transaction proposal data sent to the third user, wherein the method is performed so that the third user transaction proposal data sent to the third user is differentiated from the transaction proposal data sent to the second user in dependence on the third user and the second user having different associated location data.

11. A computer program product comprising:
a computer readable storage medium readable by one or more processing circuit and storing instructions for execution by one or more processor for performing a method comprising:
registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user;
examining location data of the second user in response to activation of the payment URL by the second user and determining one or more variable data values in dependence on the location data of the second user;
generating transaction proposal data using the one or more variable data values;
sending the transaction proposal data to the second user for approval; and
in response to receiving the approval from the second user completing a payment transaction defined by the transaction proposal data, wherein the examining location data of the second user includes examining current location data of the second user and wherein the determining one or more variable data values in dependence on the location data of the second user, includes determining the one or more variable data values in dependence on a current location of the second user, wherein the current location data includes GPS based data, and wherein the method includes resolving the GPS based data into a shipping address.

12. The method of claim 1, wherein the examining location data of the second user in response to activation of the payment URL by the second user and determining one or more variable data values in dependence on the location data of the second user includes examining current location data of the second user in response to activation of the payment URL by the second user and determining one or more variable data values in dependence on the current location data of the second user.

13. The method of claim 1, wherein the examining location data of the second user in response to activation of the payment URL by the second user and determining one or more variable data values in dependence on the location data of the second user includes examining current GPS based location data of the second user provided by a GPS sensor of a client computer device of the second user in response to activation of the payment URL by the second user and determining one or more variable data values in dependence on the current GPS based location data of the second user.

14. The method of claim 1, wherein the examining location data of the second user in response to activation of the payment URL by the second user and determining one or more variable data values in dependence on the location data of the second user includes examining current GPS based location data of the second user provided by a GPS sensor of a client computer device of the second user in response to clicking on the payment URL by the second user, which payment URL has been registered to the first user in response to the receipt of registration data from the first user, and determining one or more variable data values in dependence on the current GPS based location data of the second user.

15. The computer program product of claim 11, wherein the registering a payment URL to the first user includes registering the payment URL so that the payment URL has first, second and third variable content fields, wherein the first variable content field specifies a size of an item for shipment from the first user to the second user in terms of one or more of the following selected from the group consisting of weight and dimensions, and wherein the determining the one or more variable data values is in dependence on the location data of the second user and in dependence on the item size specified in the first variable content field, wherein the registering a payment URL to the first user includes registering, wherein the second variable content field specifies a carrier service selected from the group consisting of a government carrier service, a first private enterprise carrier service and a second private enterprise carrier service, and wherein the determining the one or more variable data values is in dependence on the location data of the second user and in dependence on the carrier service specified in the second variable content field, wherein the third variable content field specifies a carrier service selected from the group consisting of a government carrier service, a first private enterprise carrier service and a second government enterprise carrier service, and wherein the determining the one or more variable data values is in dependence on the location data of the second user and in dependence on the carrier service specified in the third variable content field.

16. The computer program product of claim 11, wherein the method includes, contemporaneously with the examining location data of the second user in response to activation of the payment URL by the second user, examining location data of a third user in response to activation of the payment URL by the third user and determining for use in providing a transaction proposal to the third user one or more variable data values in dependence on the location data of the third user; generating third user transaction proposal data for sending to the third user using the one or more variable data values determined by the examining location data of the third user; sending the third user transaction proposal data to the third user for approval; and in response receiving the approval from the third user completing a payment transaction defined by the third user transaction proposal data sent to the third user, wherein the method is performed so that the third user transaction proposal data sent to the third user is differentiated from the transaction proposal data sent to the second user in dependence on the third user and the second user having different associated location data.

17. A system comprising:
a memory;
at least one processor in communication with the memory; and
program instructions executable by one or more processor via the memory to perform a method comprising:
registering a payment URL to a first user in response to receipt of registration data being received from a first user, wherein the payment URL is operative so that when the payment URL registered to the first user is activated by a second user, a web browsing session is commenced in which an electronic payment transaction is facilitated, the electronic payment transaction permitting electronic funds transfer from the second user to the first user;
examining location data of the second user in response to activation of the payment URL by the second user and determining one or more variable data values in dependence on the location data of the second user;
generating transaction proposal data using the one or more variable data values;
sending the transaction proposal data to the second user for approval; and
in response to receiving the approval from the second user completing a payment transaction defined by the transaction proposal data, wherein the examining location data of the second user includes examining current location data of the second user and wherein the determining one or more variable data values in dependence on the location data of the second user, includes determining the one or more variable data values in dependence on a current location of the second user, wherein the current location data includes GPS based data, and wherein the method includes resolving the GPS based data into a shipping address.

18. The system of claim 17, wherein the determining one or more variable data values includes using a location to shipping cost mapping knowledgebase to return shipping cost information, wherein one or more variable data field of the transaction proposal data includes the shipping cost information, wherein the determining one or more variable data values includes using a location to tax mapping knowledgebase to return tax information, wherein one or more variable data field of the transaction proposal data includes the tax information.

19. The system of claim 17, wherein the determining one or more variable data values includes using a location to shipping cost mapping knowledgebase to return shipping cost information, wherein one or more variable data field of the transaction proposal data includes the shipping cost information, wherein the determining one or more variable data values includes using a location to tax mapping knowledgebase to return tax information, wherein one or more variable data field of the transaction proposal data includes the tax information, wherein the registering a payment URL to the first user includes registering the payment URL so that the payment URL has first, second and third variable content fields, wherein the first variable content field specifies a size of an item for shipment from the first user to the second user in terms of one or more of the following selected from the group consisting of weight and dimensions, and wherein the determining the one or more variable data values is in dependence on the location data of the second user and in dependence on the item size specified in the first variable content field, wherein the registering a payment URL to the first user includes registering, wherein the second variable content field specifies a carrier service selected from the group consisting of a government carrier service, a first private enterprise carrier service and a second private enterprise carrier service, and wherein the determining the one or more variable data values is in dependence on the location data of the second user and in dependence on the carrier service specified in the second variable content field, wherein the third variable content field specifies a carrier service selected from the group consisting of a government carrier service, a first private enterprise carrier service and a second government enterprise carrier service, and wherein the determining the one or more variable data values is in dependence on the location data of the second user and in dependence on the carrier service specified in the third variable content field, wherein the method includes, contemporaneously with the examining location data of the second user in response to activation of the payment URL by the second user, examining location data of a third user in response to activation of the payment URL by the third user and determining for use in providing a transaction proposal to the third user one or more variable data values in dependence on the location data of the third user; generating third user transaction proposal data for sending to the third user using the one or more variable data values determined by the examining location data of the third user; sending the third user transaction proposal data to the third user for approval; and in response receiving the approval from the third user completing a payment transaction defined by the third user transaction proposal data sent to the third user, wherein the method is performed so that the third user transaction proposal data sent to the third user is differentiated from the transaction proposal data sent to the second user in dependence on the third user and the second user having different associated location data.

\* \* \* \* \*